United States Patent
Roumy et al.

(10) Patent No.: US 7,298,801 B2
(45) Date of Patent: Nov. 20, 2007

(54) METHOD AND DEVICE FOR DEMODULATING SIGNALS FROM MULTIPLE USERS

(75) Inventors: Aline Roumy, Nevers (FR); Didier Pirez, Saint Gratien (FR); Inbar Fijalkow, Cergy St Christophe (FR)

(73) Assignee: Thales, Paris (FR)

( * ) Notice: Subject to any disclaimer, the term of this patent is extended or adjusted under 35 U.S.C. 154(b) by 869 days.

(21) Appl. No.: 10/111,923

(22) PCT Filed: Aug. 31, 2001

(86) PCT No.: PCT/FR01/02717

§ 371 (c)(1),
(2), (4) Date: May 1, 2002

(87) PCT Pub. No.: WO02/19557

PCT Pub. Date: Mar. 7, 2002

(65) Prior Publication Data
US 2002/0181555 A1    Dec. 5, 2002

(30) Foreign Application Priority Data
Sep. 1, 2000 (FR) .................................. 00 11198

(51) Int. Cl.
*H04B 1/10* (2006.01)
(52) U.S. Cl. ....................... 375/346; 370/342
(58) Field of Classification Search ................ 375/147, 375/232, 233, 234, 148, 150, 346; 370/332–333, 370/335, 342, 441, 473, 479
See application file for complete search history.

(56) References Cited

U.S. PATENT DOCUMENTS

| 5,414,699 A | 5/1995 | Lee |
| 5,550,810 A * | 8/1996 | Monogioudis et al. ...... 370/342 |
| 5,572,548 A | 11/1996 | Pirez et al. |
| 6,240,099 B1 * | 5/2001 | Lim et al. ................... 370/441 |
| 6,243,415 B1 | 6/2001 | Pipon et al. |
| 6,496,543 B1 * | 12/2002 | Zehavi ....................... 375/295 |
| 6,600,729 B1 * | 7/2003 | Suzuki ....................... 370/335 |
| 6,671,338 B1 * | 12/2003 | Gamal et al. ............... 375/346 |
| 7,068,743 B1 * | 6/2006 | Suzuki ....................... 375/345 |
| 2002/0110206 A1 * | 8/2002 | Becker et al. .............. 375/346 |
| 2004/0001561 A1 * | 1/2004 | Dent et al. .................. 375/308 |

OTHER PUBLICATIONS

Duel-Hallen, A Family of Multiuser Decision-Feedback Detectors for Asynchronous Code-Division Multiple-Access Channels, Feb./Apr. 1995, IEEE Transactions on Communications, vol. 43, 421-434.*

Duel-Hallen et al, Multiuser Detection for CDMA Systems, IEEE Personal Communications, vol. 2, pp. 46-58.*

Duel-Hallen A: "A Family of Multiuser Decision-Feedback Detectors for Asynchronous Code-Division Multiple-Access Channels" IEEE Transactions on Communications, US, IEEE Inc. New York, vol. 43, No. 2/04, Part 01, Feb. 1, 1995, pp. 421-434.

Klein A et al.: "Zero Forcing and Minimum Mean-Square-Error Equalization for Multiuser Detection in Code-Division Multiple-Access Channels" IEEE Transactions on Vehicular Technology, US IEEE Inc. New York, vol. 45, No. 2, May 1, 1996, pp. 276-287.

(Continued)

*Primary Examiner*—Chieh M. Fan
*Assistant Examiner*—Freshteh N Aghdam
(74) *Attorney, Agent, or Firm*—Oblon, Spivak, McClelland, Maier & Neustadt, P.C.

(57) ABSTRACT

Method and device for equalizing and decoding digital signals from K users including several modules. Each module includes an equalizer linked to a decoder. An equalizer of rank k corresponding to an index of user k is linked at least to the decoders of rank varying from 1 to k-1. Such a method and apparatus may find particular application for demodulating signals in mobile radio systems.

5 Claims, 3 Drawing Sheets

OTHER PUBLICATIONS

Figure 1:
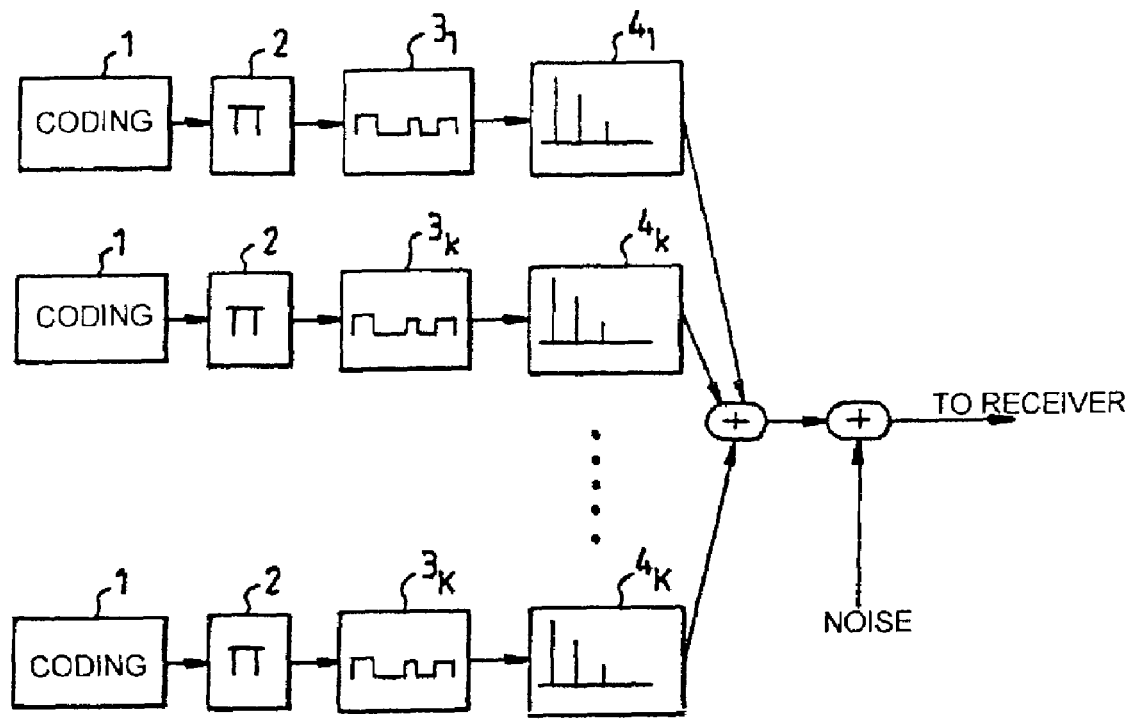

U.S. Appl. No. 10/111,923, filed May 1, 2002, pending.
U.S. Appl. No. 10/204,425, filed Aug. 29, 2002, pending.
U.S. Appl. No. 10/110,786, filed Apr. 29, 2002, pending.
Edward A. Lee and David G. Messerschmitt, "Digital Communication," 1988, Sec. 8.5, pp. 335-345.
Pulin Patel and Jack Holtzman, "Performance Comparison of a DS/CDMA System using a Successive Interference Cancellation (IC) Scheme and a Parallel IC Scheme under Fading," 1994 IEEE, pp. 510-514.

* cited by examiner

L: NUMBER OF SAMPLES PER SYMBOL

MATRIX $H_k$

METHOD AND DEVICE FOR DEMODULATING SIGNALS FROM MULTIPLE USERS

The invention relates to a method and a device for equalizing and decoding digital signals from several users.

The invention applies in a CDMA (code division multiple access) context with channel coding.

It applies in particular to third generation mobile radio systems.

In digital transmission, a receiver can be viewed as a succession of several elementary functions each performing a specific process such as filtering, demodulating, equalizing, decoding, etc.

The CDMA technique is a multiple access technique which will form the basis of third-generation mobile radio systems.

This technique is based on the spread spectrum principle in which transmission takes place at a much higher bit rate than is necessary for each user, by multiplying the useful symbols by sequences of high bit rate symbols called "spreading sequences".

All the transmissions are then performed at the same, frequency and at the same times, separation between the users being obtained by different spreading sequences.

In the first versions of CDMA systems, demodulation is carried out on a user-by-user basis. The "despreading" operation which involves remultiplying the received signal by the spreading sequence enables the signal to be brought back into its original useful frequency band, while the signals from other users remain spread; these "other users" are seen as a noise level and the processing gain, known as the "spreading gain", is equal to the ratio of the useful bit rate to the transmission bit rate. It is this processing gain which allows several users to coexist in the same frequency band.

More recent techniques attempt to demodulate all the users jointly, by considering the signals from other users as being something other than noise. These techniques, although often more complex, considerably improve the performance compared with the standard technique and in particular they resolve the "near-far effect" which is a major disadvantage resulting from the fact that, if all the mobile terminals transmit at the same power, a transmitter close to the base station appropriates to itself alone almost the total multiple access capacity in the cell, preventing the others from communicating. To prevent this, conventional systems require a high-performance power control system on each transmitter so that the signals are received with the same power at the base station.

Various decoding techniques are known in the prior art.

For example, turbo-codes are powerful error-correcting codes. The basic version uses two simple convolutional codes of which one receives data to be transmitted and the other receives data passed through an interleaver. The outputs of these two codes are then multiplexed. At the receive end, iterations are made a certain number of times between the decoding of the first and the second code, each decoding stage providing weighted information on the useful bits to the next decoding stage. The successive decoding stages improve the knowledge on the bits to be decided. This iterative procedure, with very simple elementary decoding stages, enables performance levels to be achieved that are comparable with those using much more complex codes.

In turbo-equalization or turbo-detection, the iterative processing principle is adopted using an equalizer and a decoder separated by an interleaver. This principle is applied to demodulation on a frequency-selective channel which requires, as first processing stage, an equalizer. By iteration between equalization steps and decoding steps, the equalizer benefits from information associated with the error-correcting code, to which information it does not normally have access. In this way, an attempt is made to approach the performance levels of optimal joint decoding implementing both the equalization stage and the correcting code, which turns out to be too complex to implement due to the presence of the interleaver.

The turbo-CDMA applies the "turbo" principle to coded CDMA transmissions. Several iterations between a multiuser demodulator and an error-correcting decoder are carried out.

Various structures have already been proposed to improve the reception of the signals.

Patent FR 95/01603 discloses a structure for joint equalization and decoding with iteration at the receive end. It is however limited to a single user. The equalizer used is an MAP (Maximum a Posteriori) equalizer known in the technical field of turbo-codes or turbo-equalizers.

Patent FR 2,763,978 describes a receiver in which equalization is performed as follows: for the first iteration, a linear equalizer is used and then an interference canceler is used for the next iterations. Although this structure is less complex than that described in patent FR 95/01603, it does not however provide for working under optimal conditions.

Other documents, for example:
the article by P. D. Alexander, M. C. Reed, J. A. Asenstorfer and C. B. Schlegel, "Iterative multiuser interference reduction: Turbo CDMA", IEEE Trans. Comm., Vol. 47, No. 7, pp. 1008-1014, July 1999, or
the article by J. Hagenauer, "The Turbo principle: Tutorial introduction and state of the art", Int. Symp. on Turbocodes, Brest, 1997, pp. 1-11, describe designs of turbo-CDMA receivers based on MAP equalizers. These receivers are extensions to the multiuser case of the Turbo-detector. Processing is performed in parallel and in a fixed manner for each user: at each iteration, the processing uses the results from the previous iteration.

The document by X. Wang and H. V. Poor, entitled "Iterative (turbo) soft interference cancellation and decoding for coded CDMA", IEEE Trans. Comm., Vol. 47, No. 7, pp. 1046-1061, July 1999, describes a principle of a turbo-CDMA receiver with filter-based interference canceling. This equalizer contains a generalization of the interference canceler usually used in turbo-equalization in the multiuser case, followed by a Wiener filter. Some complexity is inherent to the principle since a matrix inversion is required at each new symbol to be processed.

Finally, the article by A. Klein, G. Kawas Kaleh and P. W. Baier, "Zero forcing and minimum mean-square-error equalization for multiuser detection in CDMA channels", IEEE Trans. on Veh. Tech., Vol. 45, No. 2, pp. 276-287, March 1996, describes designs of multiuser equalizers without the error-correcting decoding stage.

The principle of the invention is based on a new design which fits in particular into a turbo-CDMA system. The idea is to demodulate the users one by one, each demodulation stage being followed by an error decoding stage. At the end of an iteration for a given user which corresponds to an equalization and to a decoding on the symbols of the user, there is reliable information on the symbols of the user in question. Before demodulating a user, a first step consists in subtracting from the received signal the contribution of all the interference from the users demodulated before him, said interference being determined from the information on the decided symbols. Users who have not yet been demodulated are considered as noise, the structure of which is known, in particular due to the knowledge of the spreading sequences or of the coding parameters of the signal at the transmission stage.

The invention also relates to an equalization and decoding method comprising a step in which the users are ordered before being processed.

The invention relates to a device for equalizing and decoding digital signals from K users, comprising K modules, each module comprising an equalizer linked to a decoder. It is characterized in that an equalizer of rank k is linked to several decoders of lower rank 1 to k−1.

An equalizer can comprise a first block receiving at least the signal to be demodulated, from user k, and the estimates of the symbols associated with users 1 to k−1 and a second block designed to subtract the contribution from the past symbols already demodulated.

The first block receives, for example during an ith iteration, at least the signal from user k to be demodulated, at least the estimates of the symbols associated with users 1 to k−1 corresponding to the ith iteration and the estimates of the symbols of users k+1 to K obtained which are at the (i−1)th iteration and the second block receives the estimates of the symbols of user k which are obtained at the (i−1)th iteration.

The device may include a device for determining a criterion to order the users.

The invention relates to a method for equalizing and decoding digital signals from K users in a receiver comprising several modules each comprising at least one equalizer followed by a decoder. It is characterized in that it comprises at least the following steps:

a) at iteration 1, for the user of index 1, to transmit the signal to be demodulated to an equalizer of rank 1 then to a decoder of rank 1 so as to obtain estimated modulated symbols of user k, and b) for users k of index different to 1, to transmit the signal to be demodulated to an equalizer of rank k and the various estimated modulated symbols from at least one of the decoders of rank (k−1) in order to obtain the estimated modulated symbols of user k.

The device and method according to the invention are applied to demodulate a signal in the context of a space division and/or a CDMA-type code division multiple access scheme.

The decoding method according to the invention and the suitable receiver or device have the particular advantage of overcoming interference between symbols more effectively than that of the prior art.

The method and the structure of the receiver prove also to be less complex than certain methods from the prior art using MAP (maximum a posteriori)-type equalizers or Wiener-type filters which require a matrix inversion for each symbol estimation.

Figure 2:
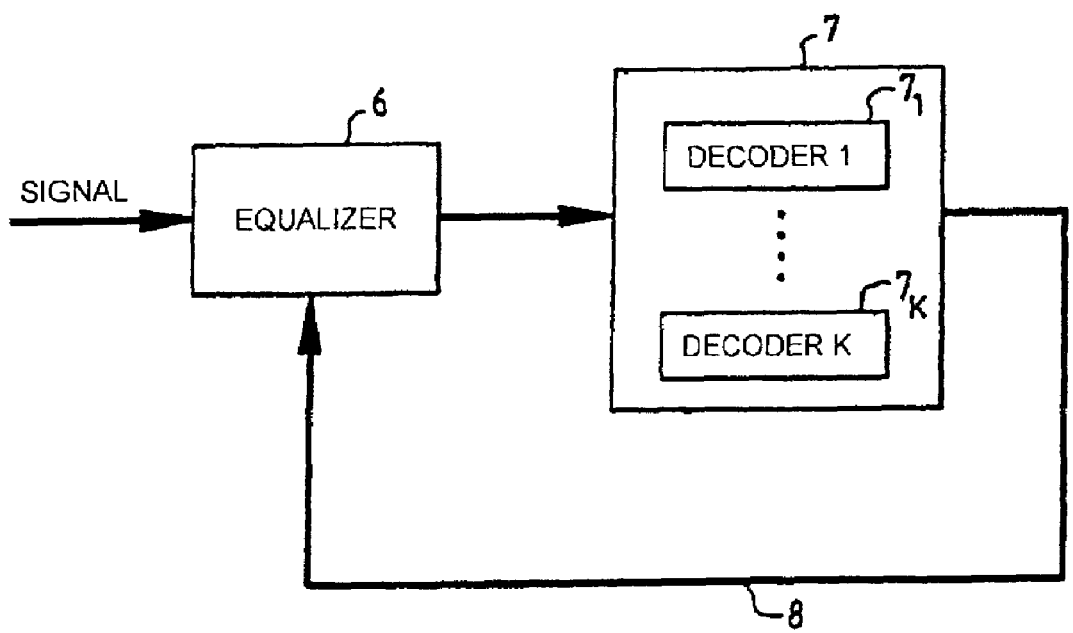
Figure 3:
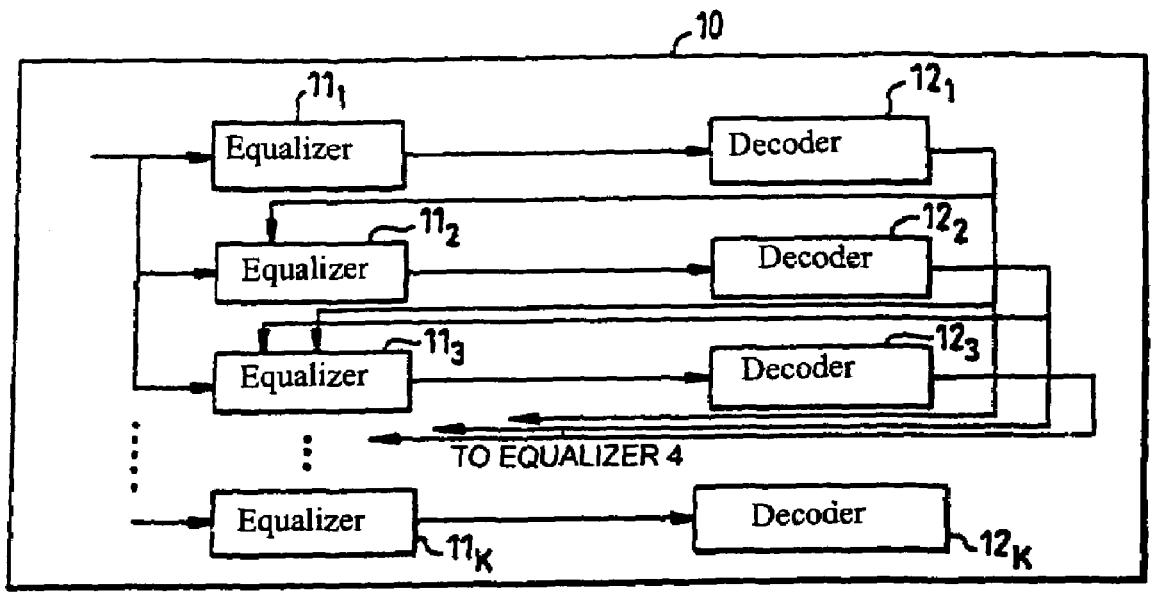
Figure 4:
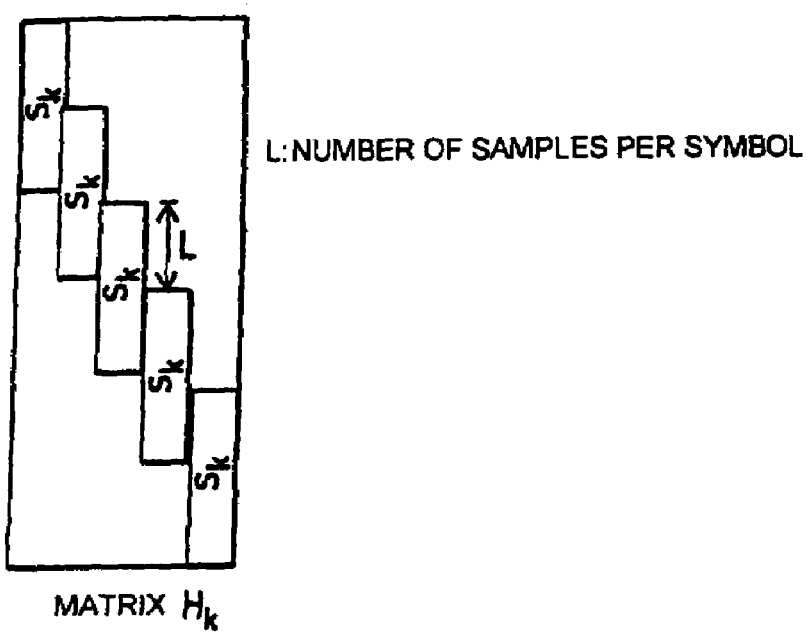
Figure 5:
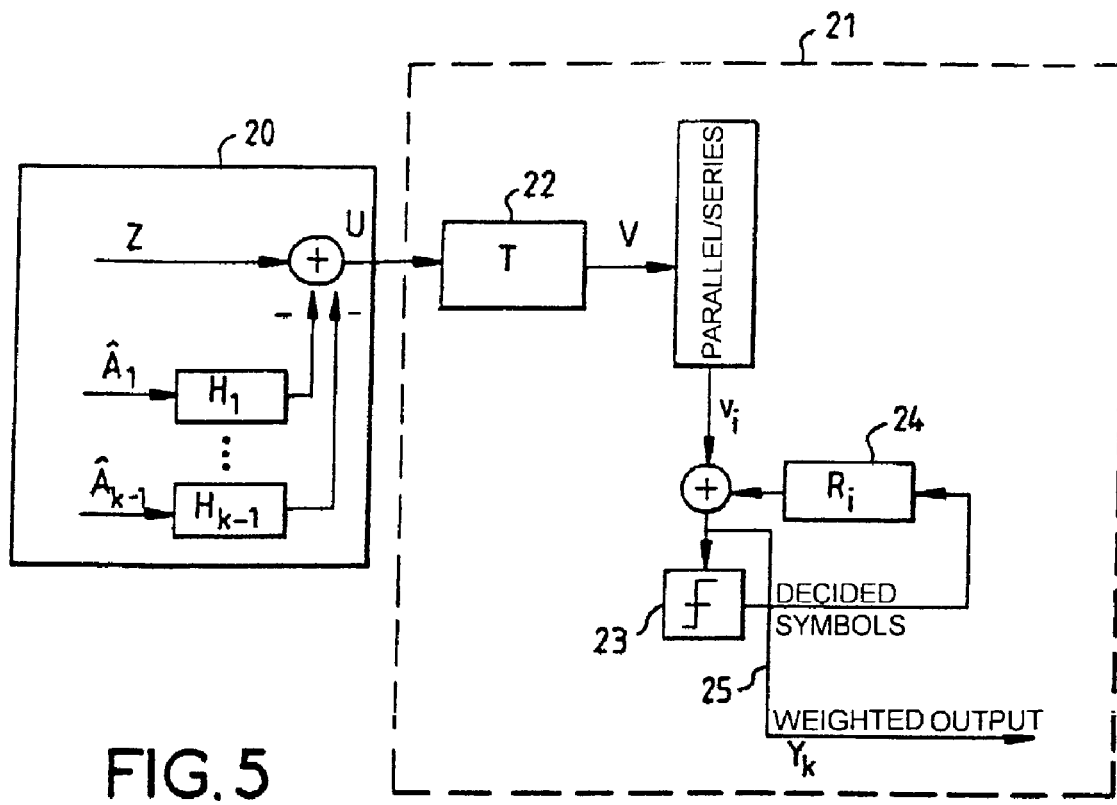
Figure 6:
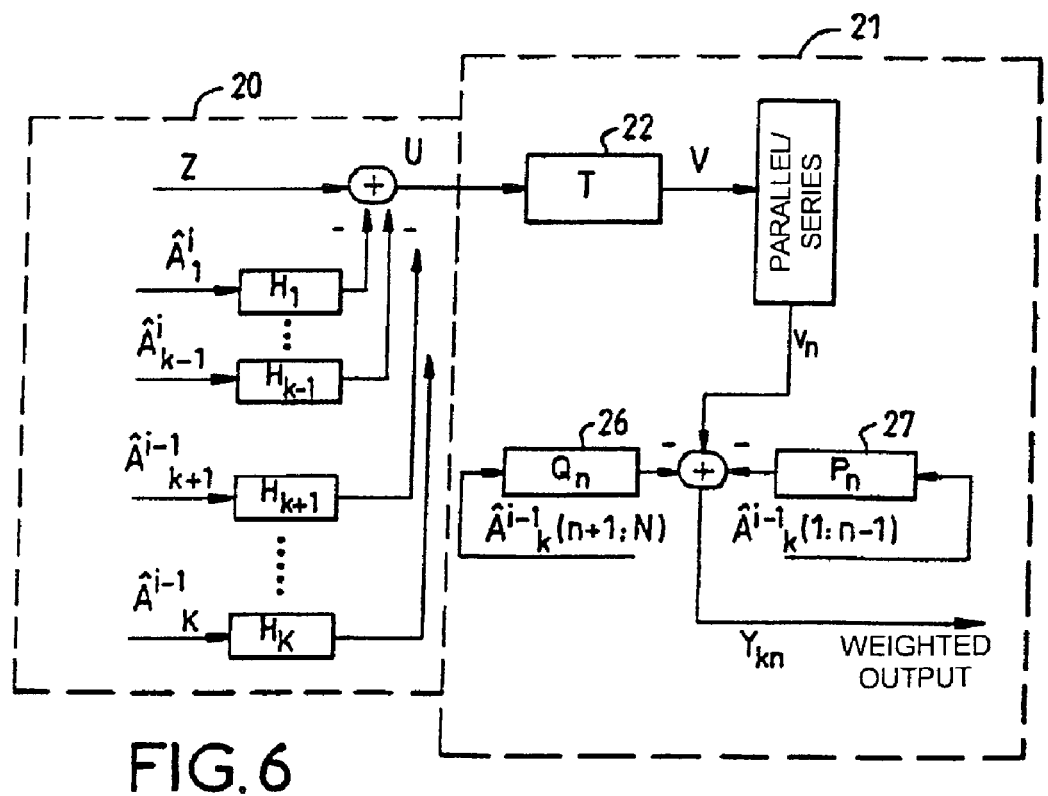

Other features and advantages of the invention will become apparent on reading the description provided below for illustration purposes and not at all limiting, in conjunction with the figures in which:

FIG. 1 is a block diagram of a system for coding the signals from K users sharing a propagation channel, FIG. 2 shows an example structure of a receiver, reducing the problem at the receive end to block diagram form, FIG. 3 shows the steps and the means implemented by the invention, FIG. 4 shows a matrix modeling the signal, FIG. 5 shows an example structure of the equalizer used in the method according to the invention, and FIG. 6 is an alternative implementation of the invention.

FIG. 1 shows a system for coding the signals transmitted by K users who share a same propagation channel and who use waveforms spread spectrally via codes, each user denoted by k, where k varies from 1 to K, having his own code. The users are considered as asynchronous users who access a same frequency-selective propagation channel in order to transmit information.

The digital signal associated with user k is coded using a correcting code 1 before being transmitted to an interleaver 2. These two functional blocks may be identical or very different for each user k. The correcting code is for example a convolutional-type code, but not necessarily so.

The coded signal is then "spread" using a spreading sequence $3_k$—the purpose of the index k is to denote the specific spreading sequence for each user k. The different spreading sequences for each user thus provide for discrimination between them. A modulated signal will see a different propagation channel $4_k$ for each user. This typically corresponds to the uplink of a cellular mobile radio system. The concept of propagation channel includes for example any time shifts resulting from an absence of synchronization between the K users.

The receiver sees the sum of the various contributions of the signals from the various propagation channels. Thermal noise associated with the input stages of the receiver described below or even interference from signals transmitted in the same frequency band, for example mobile terminals of neighboring cells using the same frequency, may be added to these signals.

To simplify the description, the modulation operations, typically the shaping by a half-Nyquist filter and the transmission via carrier, which are known to a person skilled in the art, are not represented in FIG. 1.

FIG. 2 shows a very general block diagram of a receiver.

The signal made of all the symbols of all K users arrives in a multiuser equalizer 6 before being transmitted to a decoding device 7 comprising one or more decoders $7_k$.

The equalizer 6 receives the signal from the various users along with information provided by the decoding block 7 on the coded symbols via a link 8, except when no decoding has been performed. The equalizer 6 delivers as output weighted information on the coded symbols which make use of these two types of information, typically the probabilities of transmission of the various possible symbols.

The functions for deinterleaving and shaping the weighted information between the equalizer and the decoders are not represented in the figure. These functions are for example for translating information on the 8-ary symbols into probabilities on the bits when the modulation is in 8 states and the code is binary.

The decoder or decoders $7_k$ receive information from the equalizer and make use of the information associated with the error-correcting code so as to provide more reliable information on the useful symbols and therefore the coded symbols. For example for a convolutional code, the decoder can be of the "MAP" (maximum a posteriori) type and calculates the probabilities on the useful symbols from the knowledge of the probabilities on the coded symbols.

The weighted information is then reinterleaved and reshaped before being reinputted into the "equalizer" block. The data interleaving step is carried out according to a method known to a person skilled in the art and will not be detailed. One way of proceeding consists for example in writing the data column by column in a matrix of appropriate dimension and reading this matrix row by row for example. This advantageously results in any errors being distributed during the reading stage of the signal. The shaping is performed according to conventional methods which are known to a person skilled in the art, and hence are not detailed.

FIG. 3 shows a structure of a receiver 10 according to the invention comprising several equalizers $11_k$ and several decoders $12_k$, where the index k is used to identify a user.

The receiver therefore comprises as many modules as there are users, each module being formed from an equalizer and a decoder.

The signal comprising the symbols from all the users is received by each equalizer $11_k$ of the receiver 10.

Step a)

The equalizer of rank 1 referenced $11_1$, receives for example the samples from the signal to be decoded, without information a priori on its own symbols or on the symbols of the other users. The information resulting from this first equalization is transmitted to the decoder of rank 1 denoted by $12_1$, which provides more reliable information on the useful symbols and therefore the modulated symbols of the user.

Step b)

The reliable information, on the useful symbols, obtained for user 1 is then transmitted to the equalizer of rank 2, $11_2$, which also receives the samples of the received signal to be decoded. The equalizer thus enables the interference associated with the user of rank 1 to be taken into account, while still knowing nothing a priori about the symbols of the users of rank greater than or equal to 2. The information from this second equalization is then transmitted to the decoder of rank 2, $12_2$, which will provide information on the useful symbols of the user of rank 2.

Step b) is executed as many times as there are users of rank different to 1, that is K−1 times.

To generalize, for the user of index k, the samples of the signal are transmitted to the equalizer of rank k, $11_k$, which also receives the useful symbols relating to the users of rank 1 to k−1, resulting from the different decoders $12_1, \ldots, 12_{k-1}$. The equalizer $11_k$ thus takes into account the interference associated with the users of rank 1 to (k−1) for decoding the signal associated with user k. The information arising from this kth equalization is then transmitted to the decoder of rank k, $12_k$, which will provide information on the useful symbols of the user of rank k.

The last equalizer has information on all the other users.

According to an embodiment of the invention, the equalizer used has a two-part structure. The first part is for subtracting for a user k in question the participation of the users of rank 1 to k−1, and the second part corresponds to a decision feedback equalizer (DFE) structure having the characteristics described below.

The signal received by the equalizer can be modeled as described below.

It is assumed that a block of received samples can be arranged in a vectorial form Z. This block of samples arises from the contribution of the K users, each of them contributing with N coded symbols.

The contribution from an arbitrary user of index k to the received signal is obtained, without taking into account the modulation operations on the carrier, via the following operations:

spreading by a factor Q of each coded symbol, shaping, for example by a half-Nyquist filter, filtering by the propagation channel by introducing multiple paths for example, anti-aliasing filtering at the receive end, and sampling.

The signal from user k before sampling is given for example by equation (1) below $$z_k(t) = \sum_n a_{n,k} \sum_{q=1}^{Q} c_{q,k} \cdot (h \otimes p_k \otimes f)(t - qT_c - nT_s) \quad (1)$$

In this equation, h represents the shaping filter at the transmission stage, $p_k(t)$ is the propagation channel specific to a user k, f(t) is the receive filter before sampling, $T_c$ is the chip period, inverse of the modulation rate, and $T_s$ is the symbol period before spreading. The symbols $a_{n,k}$ are the coded symbols of the user k and the symbols $c_{q,k}$ are the chips of the spreading sequence, where n corresponds to the temporal index of the coded symbol and q corresponds to the index of the chips or symbols of the spreading sequence.

The symbol $\otimes$ represents the convolution.

Suppose:

$$s_k(t) = \sum_{q=1}^{Q} c_{q,k} \cdot (h \otimes p_k \otimes f)(t - qT_c) \quad (2)$$

Then:

$$z_k(t) = \sum_n a_{n,k} s_k(t - nT_s) \quad (3)$$

Equation (3) shows that the contribution of each user k can be put in the form of filtering of a train of symbols by a certain function $S_k(t)$ which contains the effects of the spreading, of the shaping filter at the transmission stage, of the propagation and of the receive filters before sampling.

Let $S_k$ be the vector containing the samples of $s_k(t)$. Then the sampled signal can be rewritten for the user k as follows:

$$Z_k = H_k \cdot A_k \quad (4)$$

where $A_k$ is the vector of N symbols $a_{n,k}$ and $H_k$ is a matrix constructed from the vector Sk in the manner described in FIG. 4.

The columns of the matrix $H_k$ are constructed from shifted versions of the sequence $S_k$, and each column corresponds to a new symbol of the vector $A_k$ and the shift corresponds to the number of samples per symbol. The recovery between the various shifted versions of $S_k$ corresponds to the duration of the overall impulse response (filters plus propagation channel).

The complete model can then be represented as follows:

$$Z = \sum_{k=1}^{K} H_k A_k + W \quad (5)$$

In this equation (5), W is a noise vector associated with the interference outside the cell and with the noise inside the receiver.

FIG. 5 shows the structure of an equalizer operating by using the feedback principle described previously in relation to FIG. 3.

During equalization of user k, the purpose of the first block 20 is to subtract from the received signal Z the contributions of the users of indices between 1 and k−1, that is users already processed. To do this, it receives the vectors of estimated symbols corresponding to these users. The estimate of the symbols is made for example by calculating the mathematical expectation of the value of the symbol from the probabilities obtained during the decoding steps.

The purpose of the second block 21 is to process the intersymbol interference corresponding to the symbols of user k himself, and the noise resulting from the users of indices k+1 to K not yet processed and from the thermal noise. The equalizer has a DFE structure, that is it is made up of a "transverse filter" part and a "decision in feedback" part. The "transverse filter" part is calculated by taking into account the knowledge of the structure of the noise generated by the users not yet processed and by the thermal noise. The "decision in feedback" part has a sequential operation. For each index n symbol of the current user, it subtracts the contribution from the already decided lower index symbols.

The second block according to the invention comprises for example a transverse filter 22 such as a matrix being applied to the vector U, and the resulting vector V is sampled at the symbol rate. The coordinates $v_1$ of this vector are then passed into a loop comprising a decision unit 23 and a recursive filter 24. The decision unit is for obtaining a decision on the symbols. At each new symbol, the recursive filter 24 subtracts the contribution from the symbols already decided in the block and forwarded. The loop also comprises a weighted output 25, before the decision unit, for transmitting the symbols to the decoder.

The calculation from the transverse filter 22 and the recursive filter 24 is carried out for example in the manner described below.

The calculation of the filters uses as criterion the minimization of the mean square error between the weighted output of the equalizer and the vector of symbols of user k.

$$\min(E(\|Y_k - A_k\|^2)) \qquad (6)$$

From equation (5), the vector U can be represented as follows $$U = H_k A_k + B \qquad (7)$$

$$B = \sum_{l=k+1}^{K} H_l A_l + W$$

In this equation (7), the noise is made up of signals transmitted by the rank k+1 to K users not yet decoded and of the initial additive noise W.

For a white noise W, the expressions for the filters are given below:

The correlation matrix for B is $$R_B = \sigma_A^2 \cdot \sum_{l=k+1}^{K} H_l H_l^\dagger + \sigma_W^2 \cdot Id \qquad (8)$$

where $\sigma_A^2$ is the power of the modulation symbols, $\sigma_w^2$ is the power of the noise and Id is the identity matrix the matrix Q is defined by $$Q = H_k^\dagger R_B^{-1} H_k + \frac{1}{\sigma_W^2} Id \qquad (9)$$

the Cholesky composition of this matrix is formed as follows $$Q = (\Sigma L)\dagger(\Sigma L) \qquad (10)$$

In equation (10), Σ is a diagonal matrix and L is a lower triangular matrix.

The expression of the transverse filter which minimizes criterion (6) is $$T = \Sigma^{-2} L^{-1\dagger} H_k^\dagger R_B^{-1} \qquad (11)$$

The recursive filter is determined by the rows of (L-Id).

According to an embodiment of the invention, the device uses an interference canceler when all the symbols to be demodulated have been the subject of at least one decoding stage. In this situation, unlike the decision feedback equalizer, when it is desired to decide the symbol j of the user k, all the other symbols of the same user or of the other users can be considered known, even if in practice only the estimates of these symbols are known. It is then possible to subtract their contribution totally.

FIG. 6 shows the principle of this canceler in block diagram form.

Compared to the decision feedback equalizer case in FIG. 5, there is more information on all the symbols from iteration i−1 for certain users, for example those of index 1 to k−1, and from the current iteration i for the other users of index k+1 to K.

The principle implemented consists in:
subtracting the contributions from all the users other than user k being processed, by using the most recent information for each of them, for the users of index 1 to k−1 the estimates of the vectors of the symbols during iteration i and for the users of index k+1 to K the information of the estimates obtained during iteration (i−1), this iteration being carried out in the first block 20 which generates a vector U, filtering the received samples for the user k in the filter T 22, and the resulting vector V is then sampled for example at the symbol rate, subtracting in the second block 21, for a given symbol n, the residual intersymbol interference coming from the other symbols of the user k. The contribution from the symbols 1 to n−1 is determined by the filter $P_n$, 26 and the contribution from the index n+1 to N symbols is determined by a filter $Q_n$, 27.

In this way, compared with the decision feedback, much richer information is available than the previous decided symbols, that is information on the past but also future symbols from the previous iteration.

After the processing steps, the next step is the decoding step, and then the next user is considered and the contribution of user k is subtracted by using the results obtained during iteration i and no longer i−1.

The different equalization and decoding steps can advantageously be applied to a set of users who are ordered according to a criterion taking account of the power associated with a user, from which the contribution of intersymbol interference for this same user and for the other users is subtracted.

This criterion is determined for example as follows:
$h_{kl}$ denotes the lth column of the matrix $H_k$ described in relation to FIG. 4. This vector denotes the overall impulse response of the channel for the lth symbol of the block to be demodulated, of user k,
the criterion $C_k$ is determined as follows $$C_k = \sum_{n=1}^{N} \left( h_{k,n}^{\dagger} h_{k,n} - \sum_{m \neq n} | h_{k,n}^{\dagger} h_{k,m} | - \sum_{j \neq k} \sum_{m} | h_{k,n}^{\dagger} h_{j,m} | \right)$$

where the symbol † denotes the transposed conjugate, the first term corresponds to the power associated with user k, the second term corresponds to the contribution from the user and the third term to the contribution to intersymbol interference for all the other users.

This calculation involves correlations between the signals corresponding to the various symbols whether they are transmitted by the user k himself or by the others.

In fact, the method measures the existing distance, at least, between two opposed symbols at the output of a filter designed according to the impulse response $h_{k,n}$, whatever the values of the other symbols which interfere.

The users are arranged in a descending order before placing the steps of the method according to the invention.

The invention claimed is:

1. A device for equalizing and decoding digital signals from K users including K modules, each module comprising:
   an equalizer; and
   a decoder, wherein
   an equalizer of rank k, k being an index between 1 and K, is linked to at least one decoder of lower rank 1 to k−1, and an equalizer of rank k−1 thereby receives information from a user of higher rank k to K, whether symbols from signals of K users are useable or not, wherein
   each equalizer includes a first and second block,
      the first block configured to receive at least a signal to be demodulated from a user k and estimates of the symbols associated with users 1 to k−1, and
      the second block configured to subtract a contribution from past symbols already demodulated from a signal received from the first block, and
   the first block receives, at an ith iteration, at least the signal from user k to be demodulated, at least the estimates of the symbols associated with users 1 to k−1 corresponding to the ith iteration and estimates of the symbols of users k+1 to K which are obtained at the (i−1)th iteration and the second block receives the estimates of the symbols of user k which are obtained at the (i−1)th iteration.

2. A method for equalizing and decoding digital signals of K users in a receiver comprising several modules each comprising at least one equalizer followed by a decoder wherein the method comprises:
   a) at iteration 1, for a user of index 1, transmitting a signal to be modulated demodulated to an equalizer of rank 1, and from the equalizer of rank 1 to a decoder of rank 1 to obtain estimated modulated symbols of user k,
   b) for users k of index different to 1, transmitting the signal to be demodulated to an equalizer of rank k and the various estimated modulated symbols from at least one of the decoders of rank (k−1),
   performing plural iterations of step a) and step b) and, for an iteration different from the first iteration, step b) includes, during an ith iteration, transmitting to a first block of the equalizer of rank k the symbols of user k to be demodulated, estimates of the symbols of users 1 to k−1 obtained during the ith iteration and estimates of the symbols of users k+1 to K obtained during the (i−1)th iteration and to a second block of the equalizer the estimates of the symbols of user k from the (i−1)th iteration.

3. A method for equalizing and decoding digital signals of K users in a receiver comprising several modules each comprising at least one equalizer followed by a decoder wherein the method comprises:
   a) at iteration 1, for a user of index 1, transmitting a signal to be demodulated to an equalizer of rank 1, and from the equalizer of rank 1 to a decoder of rank 1 to obtain estimated modulated symbols of user k,
   b) for users k of index different to 1, transmitting the signal to be demodulated to an equalizer of rank k and the various estimated modulated symbols from at least one of the decoders of rank (k−1), and
   c) ordering the users k, before being processed, according to a criterion taking account of a corrected power, associated with user k, of a contribution of intersymbols associated with himself and with the other users,
   wherein the criterion for ordering the users is determined as follows $$C_k = \sum_{n=1}^{N} \left( h_{k,n}^{\dagger} h_{k,n} - \sum_{m \neq n} | h_{k,n}^{\dagger} h_{k,m} | - \sum_{j \neq k} \sum_{m} | h_{k,n}^{\dagger} h_{j,m} | \right)$$

where $h_{kl}$ denotes the lth column of a matrix $H_k$ constructed from the vector containing the samples of the signal of user k, and n denotes the temporal index of the coded symbol.

4. The device as claimed in claim 1, further comprising:
   a device suitable for determining a criterion to order the users before transmitting the signals to the equalizer and the decoder, the criterion taking into account a power of user k and an intersymbol interference for the user k and other users.

5. The method as claimed in claim 2, further comprising:
   ordering the users k, before being processed, according to a criterion taking account of a corrected power, associated with user k, of the contribution of intersymbols associated with the user k and with other users.

* * * * *